United States Patent
Lin et al.

(10) Patent No.: US 12,038,908 B2
(45) Date of Patent: Jul. 16, 2024

(54) BLOCKCHAIN DATA STORAGE METHOD, SYSTEM, DEVICE, AND READABLE STORAGE MEDIUM

(71) Applicant: INSPUR SUZHOU INTELLIGENT TECHNOLOGY CO., LTD., Jiangsu (CN)

(72) Inventors: Kaizhi Lin, Jiangsu (CN); Zhikai Cai, Jiangsu (CN); Po Hsueh Huang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/246,659

(22) PCT Filed: Apr. 26, 2021

(86) PCT No.: PCT/CN2021/089875
§ 371 (c)(1),
(2) Date: Mar. 24, 2023

(87) PCT Pub. No.: WO2022/095346
PCT Pub. Date: May 12, 2022

(65) Prior Publication Data
US 2024/0045853 A1 Feb. 8, 2024

(30) Foreign Application Priority Data
Nov. 6, 2020 (CN) .......................... 202011229981.9

(51) Int. Cl.
*G06F 16/23* (2019.01)
(52) U.S. Cl.
CPC ............................. *G06F 16/2365* (2019.01)

(58) Field of Classification Search
CPC .................................................. G06F 16/2365
See application file for complete search history.

(56) References Cited

U.S. PATENT DOCUMENTS

2020/0076574 A1* 3/2020 Austin ................. H04L 9/0637
2020/0344044 A1 10/2020 Song et al.
(Continued)

FOREIGN PATENT DOCUMENTS

| CN | 104794024 A | 7/2015 |
| CN | 107644056 A | 1/2018 |

(Continued)

OTHER PUBLICATIONS

International search report for PCT/CN2021/089875 mailed on Jul. 26, 2021.
(Continued)

*Primary Examiner* — Jason W Blust
(74) *Attorney, Agent, or Firm* — Dennemeyer & Associates LLC; Victoria Friedman (57) ABSTRACT

Provided are a blockchain data storage method, a system, a device, and a readable storage medium. The method includes: obtaining, by a block file system, a target block serial number and target block contents of a target block, the block file system including a directory region and a data region, a size of each cluster in the data region being the same as a block size of blockchain, the directory region storing mapping relationships between block serial numbers and cluster addresses; sequentially allocating a target cluster address to the target block, and recording, in the directory region, a target mapping relationship between the target block serial number and the target cluster address; and sequentially writing the target block contents into the data region according to the target cluster address.

20 Claims, 7 Drawing Sheets

(56) References Cited

U.S. PATENT DOCUMENTS

2021/0200570 A1* 7/2021 Jang .......................... H04L 9/50
2022/0019901 A1* 1/2022 Saleh ..................... H04L 9/3247

FOREIGN PATENT DOCUMENTS

| CN | 110008206 A | 7/2019 |
| CN | 110286859 A | 9/2019 |
| CN | 111782656 A | 10/2020 |
| CN | 112463753 A | 3/2021 |

OTHER PUBLICATIONS

Search report for Chinese application 202011229981.9, filed Nov. 6, 2020.

* cited by examiner

BLOCKCHAIN DATA STORAGE METHOD, SYSTEM, DEVICE, AND READABLE STORAGE MEDIUM

CROSS-REFERENCE TO RELATED APPLICATIONS

This is a 35 U.S.C. 371 National Stage Patent Application of International Application No. PCT/CN2021/089875, filed Apr. 26, 2021, which claims priority to Chinese application 202011229981.9, filed Nov. 6, 2020, each of which is hereby incorporated by reference in its entirety.

TECHNICAL FIELD

The present disclosure relates to the technical field of blockchain, in particular to a blockchain data storage method, a system, a device, and a readable storage medium.

BACKGROUND

Blockchain storage technology essentially refers to the management of each blockchain storage system (such as the simplest desktop, mid- to high-end server) as the smallest storage unit, hoping to achieve confidentiality, fault-tolerant data backup, etc. in the protocol layer or software application layer based on the characteristics of blockchain, coupled with distributed storage.

Current computer systems, when improving blockchain storage technology, need to consider not only data storage in a file system and a storage apparatus controller at a software layer, but also program execution and compatibility with older systems. This limits the development of blockchain storage in storage optimization and other new technologies. Therefore, with the increasing data storage capacity and the need for fast storage, the current blockchain storage technology still has the problem of low data storage speed.

To sum up, how to effectively solve the problem of low data storage speed in blockchain is an urgent technical problem for a person skilled in the art at present.

SUMMARY

The object of the present disclosure is to provide a blockchain data storage method, a system, a device, and a readable storage medium to increase the blockchain data storage speed.

In order to solve the above-mentioned technical problems, the present disclosure provides the following technical solutions.

A blockchain data storage method includes: obtaining, by a block file system, a target block serial number and target block contents of a target block, the block file system including a directory region and a data region, a size of each cluster in the data region being the same as a block size of blockchain, the directory region storing mapping relationships between block serial numbers and cluster addresses; sequentially allocating a target cluster address to the target block, and recording, in the directory region, a target mapping relationship between the target block serial number and the target cluster address; and sequentially writing the target block contents into the data region according to the target cluster address.

In an embodiment, the method further includes: receiving a read request to read the target block; searching the directory region for the target cluster address corresponding to the target block serial number; reading the target block contents from the data region according to the target cluster address; and outputting the target block contents.

In an embodiment, the method further includes: reading a directory in the directory region, and writing the directory into a cache to obtain a cache directory.

Accordingly, the step of recording, in the directory region, a target mapping relationship between the target block serial number and the target cluster address includes: recording, in the cache directory, the target mapping relationship.

In an embodiment, the method further includes: receiving a read request to read the target block; searching the cache directory for the target cluster address corresponding to the target block serial number; reading the target block contents from the data region according to the target cluster address; and outputting the target block contents.

In an embodiment, the method further includes: reading a directory in the directory region, and copying the directory into a CAM to obtain a CAM directory.

Accordingly, the recording, in the directory region, a target mapping relationship between the target block serial number and the target cluster address includes: recording, in the CAM directory, the target mapping relationship.

In an embodiment, the method further includes: receiving a read request to read the target block; searching the CAM directory for the target cluster address corresponding to the target block serial number; reading the target block contents from the data region according to the target cluster address; and outputting the target block contents.

In an embodiment, the sequentially writing the target block contents into the data region includes: writing the target block contents into contiguous sectors of a hard disk corresponding to the data region.

A block file system includes: a to-be-stored block obtaining module, configured to obtain a target block serial number and target block contents of a target block, the block file system including a directory region and a data region, a size of each cluster in the data region being the same as a block size of blockchain, the directory region storing mapping relationships between block serial numbers and cluster addresses; a mapping relationship recording module, configured to sequentially allocate a target cluster address to the target block, and record, in the directory region, a target mapping relationship between the target block serial number and the target cluster address; and a data write module, configured to sequentially write the target block contents into the data region according to the target cluster address.

An electronic device includes: a memory, configured to store a computer program; and a processor, configured to implement, when executing the computer program, the steps of the above-mentioned blockchain data storage method.

A readable storage medium has a computer program stored thereon, and the computer program implements, when executed by a processor, the steps of the above-mentioned blockchain data storage method.

With the implementation of the method provided by the embodiment of the present disclosure, the block file system obtains the target block serial number and the target block contents of the target block, the block file system including the directory region and the data region, the size of each cluster in the data region being the same as the block size of blockchain, the directory region storing the mapping relationships between the block serial numbers and the cluster addresses; the target cluster address is sequentially allocated to the target block, and the target mapping relationship between the target block serial number and the target cluster address is recorded in the directory region; and the target block contents are written into the data region according to the target cluster address.

In this method, the block file system sets the size of each cluster in the data region as the block size based on the unique serial number, i.e., the block serial number, of each block of blockchain as well as the fixed size of the blocks, such that mapping relationships recorded in the directory region are correspondingly the mapping relationships between the block serial numbers and the cluster addresses. In other words, the blocks correspond to the clusters, and the directory region directly uses the block serial numbers as cluster indexes. The mapping relationship between the blockchain directory structure and the data region is simple and clear, and each block corresponds to one cluster. In this method, during block storage, the target block contents may be directly sequentially written into the data region after the target cluster address is determined. Since the directory is simple, data write can adopt sequential write, which may greatly save search time and data write time and may increase the data write speed in blockchain.

Accordingly, embodiments of the present disclosure further provide a block file system, a device and a readable storage medium corresponding to the blockchain data storage method, which have the above-mentioned technical effects and will thus not be repeated here.

BRIEF DESCRIPTION OF THE DRAWINGS

For clearer descriptions of the technical solutions according to the embodiments of the present disclosure or in the related art, drawings that are to be referred for description of the embodiments or the related art are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION OF THE EMBODIMENTS

In order that a person skilled in the art may better understand the solutions of the present disclosure, the following detailed description of the present disclosure is made with reference to the accompanying drawings and detailed description. Apparently, the drawings described below are only embodiments of the present disclosure. Based on these drawings, a person of ordinary skill in the art may obtain other drawings without creative efforts.

In order to facilitate an understanding of the technical solutions according to the embodiments of the present disclosure, the relevant technical terms involved are simply described below:

Blockchain refers to a string of textual records (also referred to as blocks) with contents being cryptographically concatenated and protected.

An interplanetary file system (IPFS) is a distributed file system that attempts to connect all computing devices to the same file system. The IPFS protocol combines the advantages of blockchain technology and various network protocols to store immutable data, remove duplicate files from the network, and obtain address information of storage nodes for search for files on the network. The IPFS divides files into fixed-size blocks, each of which is indexed by a unique set of serial numbers (CID/ID) and stored in the distributed file system with block contents. The distributed file system reads all blocks based on the CID and restores the blocks to an original file.

A file system, a module in the current operating system, is responsible for the management and storage of data in the form of files in a computer system.

A file allocation table (FAT) refers to a file system invented and partially patented by Microsoft for use in MS-DOS and all Windows systems.

Ext2 is the most traditional disk file system for Linux, followed by Ext3/4, etc., has the same basic principle as FAT, but may be regarded as an improvement of FAT.

A content addressable memory (CAM) is a special type of computer storage used in some very high-speed search programs. The CAM not only has a data comparator and an address encoder, but also provides high-speed data search capability in addition to the data access characteristics of common memories. The common application is to search for specific network packet contents in semiconductor integrated circuits. With today's semiconductor technology, the search efficiency may reach 200 M/S (200 megabytes per second) or more. If the CAM adopts a static random access memory (SRAM), each search delay may be as small as 5 nanoseconds. If the CAM adopts a dynamic random access memory (DRAM) due to higher requirements for storage space, each search delay is approximately 100-150 nanoseconds.

System Call: a series of functions provided by the kernel. These system calls are implemented in the kernel and are then given to a user in some way. The system calls are an interface between a user program and the kernel.

A device driver is a special program that enables communication between a computer and an apparatus/device. The device driver is equivalent to a hardware interface, only through which the operating system may control operation of a hardware apparatus/device.

A logical block address (LBA) is a common mechanism used on a data storage apparatus of the computer system to indicate the location of data.

A physical block address (PBA) is a data sector of a hard disk drive or a data page of a solid state drive. During file read/write, software programs request files from the system with logical block addresses for compatibility purposes, and a file system and a storage apparatus controller of the system convert the logical block addresses to physical block addresses to find the true address of data for data read/write, that is, conversion from the LBA to the PBA for the data sector of the hard disk drive or the data page of the solid state drive.

A sector is the smallest storage unit of a traditional hard disk drive. The basic unit of disk read/write is a sector, and the basic unit of the solid state drive is a page.

A cluster is a group of contiguous sectors, and each cluster may include 2, 4, 8, 16, 32, 64, . . . , i.e. 2 to the nth power of sectors. The smallest unit of file operation by the file system is a cluster.

File directory table (FDT).

A linked list refers to a data structure, and is a non-contiguous, non-sequential storage structure on a physical storage unit. The logical order of data elements is implemented by the linking order of pointers in the linked list. The linked list consists of a series of nodes (each element in the linked list is referred to as a node), and the nodes may be generated dynamically at runtime. Each node includes two parts: a data field that stores data elements and a pointer field that stores the address of the next node. Compared to the sequential structure of a linear list, the operation is complex. Since the linked list does not have to be stored sequentially, the linked list may reach the complexity of O(1) when inserted, which is much faster than another linear list and sequential list. However, the time of O(n) is required to find a node or access a node with a specific serial number, and corresponding time complexities of linear lists and sequential lists are O(log n) and O(1), respectively.

Figure 1:
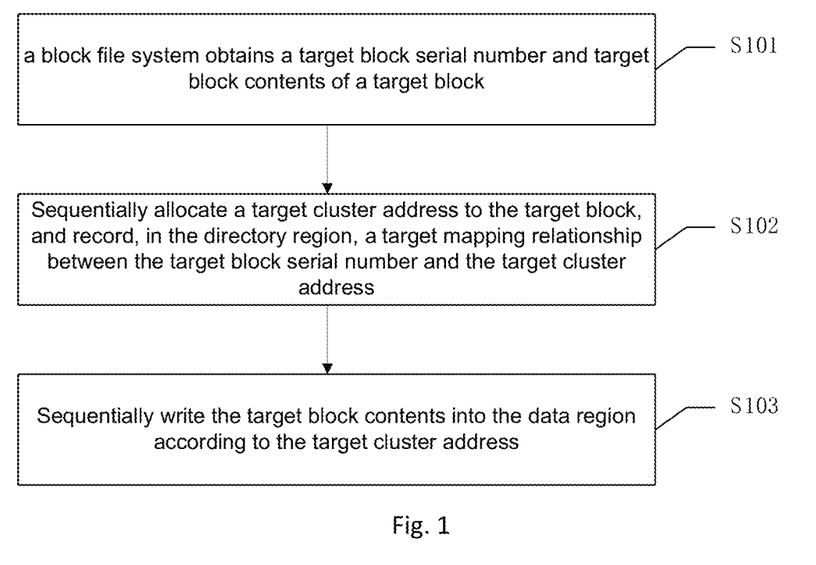
FIG. 1 is a flow chart of implementation of a blockchain data storage method according to an embodiment of the present disclosure.
Figure 4:
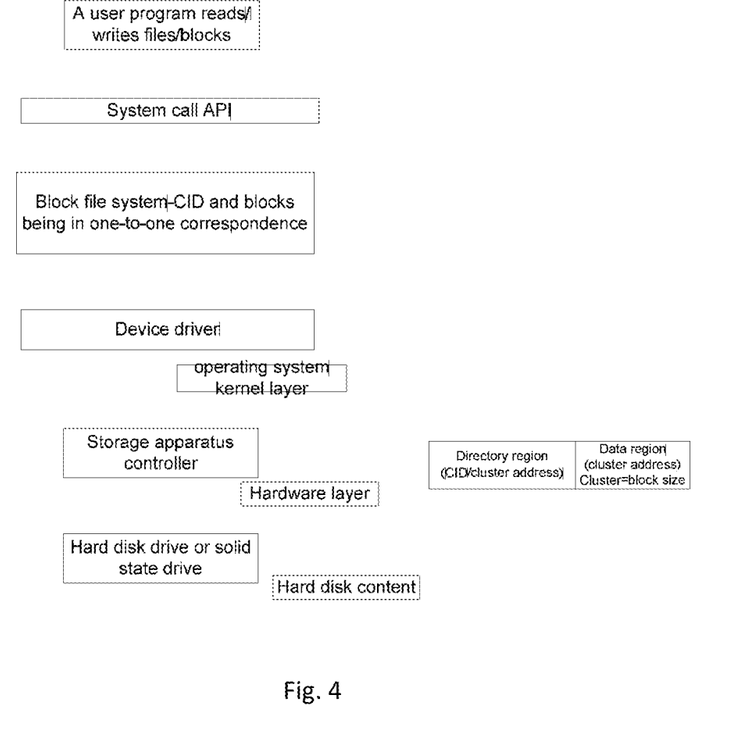
FIG. 4 is a schematic diagram of a data access according to an embodiment of the present disclosure.

Referring to FIG. 1 and FIG. 4, wherein FIG. 1 is a flow chart of a blockchain data storage method according to an embodiment of the present disclosure, and FIG. 4 is a schematic diagram of a data access according to an embodiment of the present disclosure.

As shown in FIG. 4, the block write/read process of blockchain needs to pass through a software program, a system call, and a file system, and finally to a physical hard disk. The file system (matched with a storage apparatus controller) plays a key role in converting logical block addresses corresponding to the software program and a kernel layer of an operating system into physical block addresses of the hard disk. The hard disk is actually read and written to obtain block contents corresponding to a desired file (each file corresponds to one or more blocks). The method may be applied to the block file system in the data access schematic architecture shown in FIG. 4, and includes the following steps:

S101. Obtain, by the block file system, a target block serial number and target block contents of a target block.

The block file system includes a directory region and a data region. The size of each cluster in the data region is the same as the block size of blockchain. The directory region stores mapping relationships between block serial numbers and cluster addresses.

The target block may be any one of to-be-stored blocks.

Figure 2:
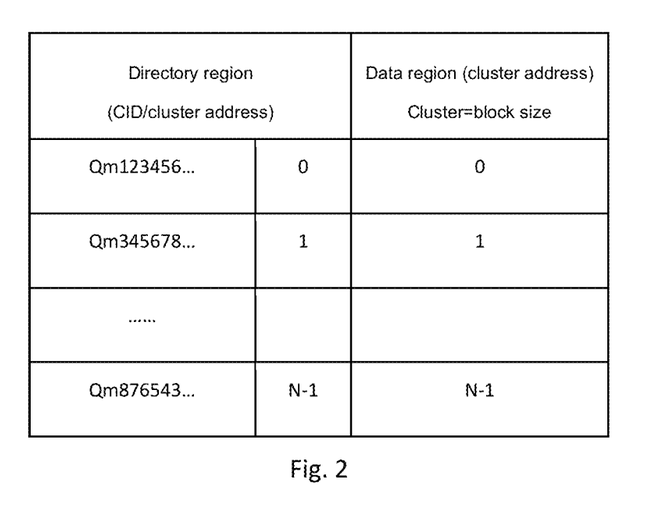
FIG. 2 is a schematic diagram of a format of a block file system according to an embodiment of the present disclosure.

The format of the block file system can refer to FIG. 2, which is a schematic diagram of the format of a block file system according to an embodiment of the present disclosure. As may be seen, the mapping relationships between the CIDs and the cluster addresses are stored in the directory region, and the size of each cluster in the data region is the same as the block size. That is, the block file system has the following features/characteristics:

the size of each cluster in the block file system is the block size, so that block data is found faster;

the block file system simplifies mapping between the directory structure and the data region;

each serial number (CID) in the directory region represents one block; and each cluster address in the directory region=each cluster address in the data region.

Figure 3:
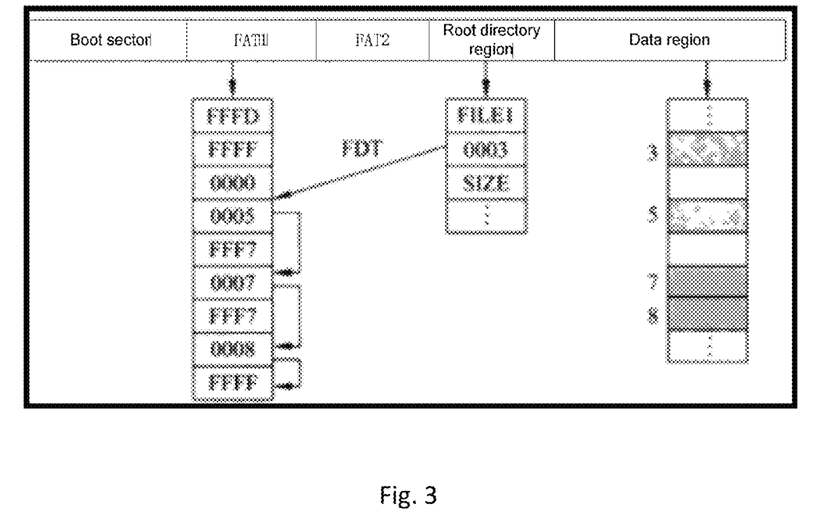
FIG. 3 is a schematic diagram of a format of an FAT file system.

In order to facilitate understanding of the features/characteristics of the block file system according to the embodiment of the present disclosure, reference can be made to FIG. 3, which is a schematic diagram of the format of an FAT file. As shown in FIG. 3, assuming that the hard disk space is arranged in a linear array, the simplified FAT file system includes from left to right:

A boot sector: located at the very beginning, and mainly records important information about system boot and the file system.

FAT1/FAT2: two file allocation tables, for the sake of system redundancy. FAT indicates how clusters are stored.

A root directory region: a directory list that stores files and directory information.

A data region: a region where data is actually stored.

Compared to the FAT file system, the directory structure of the block file system according to the embodiment of the present disclosure is simpler and clearer.

For example, the corresponding relationship between a simple directory and the block size and the actual data read and written is illustrated.

Assuming that the file system is to read/write a file name FILE1, firstly, search the root directory region, finding from the file directory table (FDT) that a starting cluster of FILE1 is a third cluster, and then find the next cluster of FILE1 until the last ending cluster from a linked list in FAT1, which are 5, 7, 8 respectively. That is, FILE1 needs 4 clusters as a storage space. Assuming that each sector of the hard disk is 512 Bytes and the file system plans that each cluster includes 8 sectors, that is, each cluster is 4096 Bytes=4 K Bytes, FILE1 occupies 4 clusters, for a total of 16 K Bytes, in the data region. Therefore, file read/write in the file system actually needs to continuously spend time on searching the root directory region and FAT1 respectively for the data access, and this process includes various collaborative efforts between the software program, the file system and a hardware controller and the hard disk.

As for the block file system according to the embodiment of the present disclosure, the cluster size is the same as the block size, each block corresponds to one cluster, and the directory may be searched with the block serial number, such that the search process may be omitted, and especially through the directory and data sequential write (referring to S102 and S103), the data write speed may be increased.

S102. Sequentially allocate a target cluster address to the target block, and record, in the directory region, a target mapping relationship between the target block serial number and the target cluster address.

Once the target block serial number and the target block contents of the target block are obtained, the target cluster address may be sequentially allocated to the target block.

Therein, sequentially allocating the cluster address may specifically include: obtain the target serial number and the target block contents, and sequentially write the target block serial number into the directory region based on the directory region and cluster addresses (corresponding to each cluster address in the directory region) of the data region, that is, a first received blockchain block cluster address is assigned as 0 and written to a hard disk cluster address 0, a second received blockchain block cluster address is assigned as 1 and written to a hard disk cluster address 1 and so on, writing to the next free space. Compared to common file systems, this embodiment does not need to search for free hard disk space, and disk search time is saved through sequential write.

It is to be noted that according to this embodiment, when the target cluster address is sequentially allocated to the target block, only one cluster address needs to be allocated, that is, each cluster corresponds to one block.

After the target cluster address is allocated, a mapping relationship between the address and the target block may be determined, i.e., the target block serial number and the target cluster address have a mapping relationship. For the sake of distinction, according to this embodiment, the mapping relationship between the target block serial number and the target cluster address is referred to as the target mapping relationship.

After the target mapping relationship is determined, the target mapping relationship may be stored in the directory region. Therefore, according to this embodiment, the directory region only needs to store the mapping relationship between the target block serial number and the target cluster address, and the storage location of the block contents may be directly retrieved based on the block serial number.

S103. Sequentially write the target block contents into the data region according to the target cluster address.

The target block contents may be sequentially written into the data region in a sequential write manner according to the target cluster address.

Sequential write of data may refer to sequential write of the block serial numbers, which will thus not be repeated here.

Since each block corresponds to one cluster, the process of writing the target block contents into the data region is to write the target block contents to contiguous space of a disk, such that the data read/write speed may be increased. In other words, sequentially writing the target block contents into the data region includes: write the target block contents into contiguous sectors of a hard disk corresponding to the data region.

With the implementation of the method provided by the embodiment of the present disclosure, the block file system obtains the target block serial number and the target block contents of the target block, the block file system including the directory region and the data region, the size of each cluster in the data region being the same as the block size of blockchain, the directory region storing the mapping relationships between the block serial numbers and the cluster addresses; the target cluster address is sequentially allocated to the target block, and the target mapping relationship between the target block serial number and the target cluster address is recorded in the directory region; and the target block contents are written into the data region according to the target cluster address.

In this method, the block file system sets the size of each cluster in the data region as the block size based on the unique serial number, i.e., the block serial number, of each block of blockchain as well as the fixed size of the blocks, such that mapping relationships recorded in the directory region are correspondingly the mapping relationships between the block serial numbers and the cluster addresses.

In other words, the blocks correspond to the clusters, and the directory region directly uses the block serial numbers as cluster indexes. The mapping relationship between the blockchain directory structure and the data region is simple and clear, and each block corresponds to one cluster. In this method, during block storage, the target block contents may be directly sequentially written into the data region after the target cluster address is determined. Since the directory is simple, data write can adopt sequential write, which can greatly save search time and data write time and can increase the data write speed in blockchain.

It is to be noted that the embodiments of the present disclosure further provide corresponding improvement solutions based on the above embodiment. According to a preferred/improved embodiment, the same steps as in the above embodiment or the corresponding steps may be cross-referenced, and accordingly, the beneficial effects may also be cross-referenced, which will thus not be repeated in the preferred/improved embodiments herein.

In an embodiment of the present disclosure, a processing flow of fast reading the target block is also provided. The specific implementation process includes:

Step 1: Receive a read request to read the target block.

Step 2: Search the directory region for the target cluster address corresponding to the target block serial number.

Step 3: Read the target block contents from the data region according to the target cluster address.

Step 4: Output the target block contents.

For ease of description, the above four steps are described below in combination.

Since the target mapping relationship between the target block serial number and the target cluster address where the target block contents are stored is recorded in the directory region, the target cluster address corresponding to the target block serial number may be directly searched for in the directory region after the read request to read the target block is received. Once the target cluster address is obtained, the target block contents may be read directly from the data region, and then the target block contents are output. In other words, after the request to read the target block is received, the block contents may be obtained from the data region of the hard disk only by searching the directory region for the target cluster address corresponding to the target block serial number, and are replied.

Compared to common file systems (for example, the FAT), the time for searching directories and waiting for reads may be saved.

In an embodiment of the present disclosure, the data access speed may also be increased through a cache directory. A specific implementation process includes: read a directory in the directory region, and write the directory to a cache to obtain the cache directory. Accordingly, recording, in the directory region, the target mapping relationship between the target block serial number and the target cluster address includes: record, in the cache directory, the target mapping relationship. Accordingly, the data read process may specifically include:

Step 1: Receive a read request to read the target block.

Step 2: Search the cache directory for the target cluster address corresponding to the target block serial number.

Step 3: Read the target block contents from the data region according to the target cluster address.

Step 4: Output the target block contents.

For ease of description, data storage and data read based on the cache directory are described below in combination.

Figure 5:
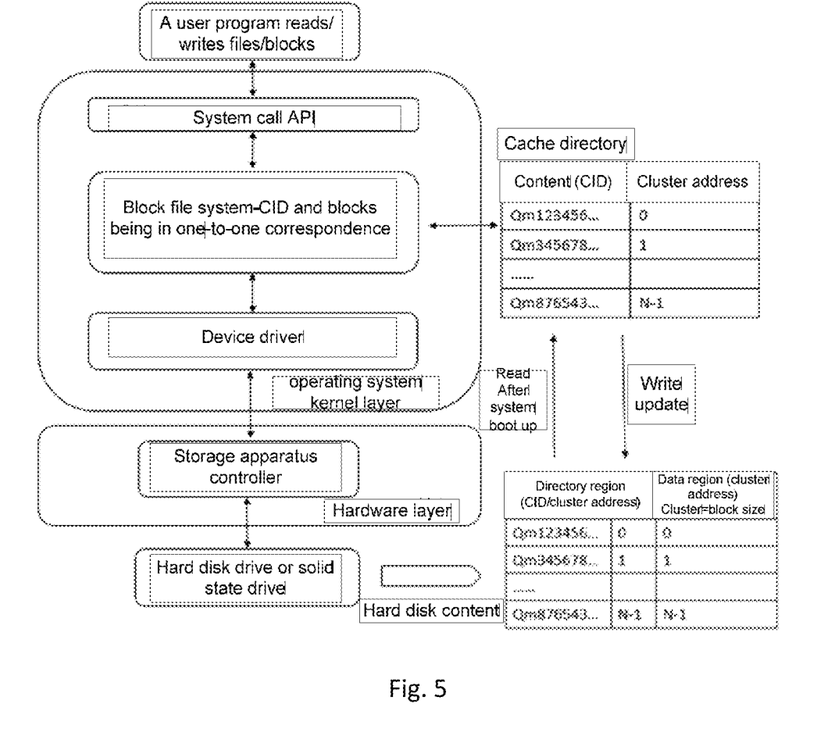
FIG. 5 is a schematic diagram of a data access based on a cache directory according to an embodiment of the present disclosure.

FIG. 5 shows a schematic diagram of a data access based on the cache directory according to an embodiment of the present disclosure.

Specifically, a hard disk directory list (i.e., a directory list stored in the directory region) may be completely or partially copied to the cache directory when a computer system is powered on and booted up. Specifically, if the cache is large enough or matched with a system volatile memory for use, the entire directory may be copied to the cache directory. Alternatively, of course, only a directory corresponding to hot data may be copied to the cache directory.

Writing blocks of the blockchain: After the target block serial number and the target block contents are obtained, firstly, the cache directory is updated (again, by sequential write), and then the target block serial number and the target block contents are sequentially written into the directory region and the data region of the hard disk based on the free hard disk space. Further, instead of being updated synchronously every time the cache directory is updated, the hard disk directory is updated only when, for example, the system is shut down, or when the system is about to lose power, or when the system is currently idle (i.e., when there are no requests to write/read a block in blockchain). It is to be noted that if the cache directory is used to speed up the data access, data synchronization between the cache directory and the directory region of the hard disk needs to be ensured.

Reading blocks of the blockchain: After the target block serial number to be read is determined, the target block contents may be obtained from the hard disk by searching the cache directory for the target cluster address corresponding to the target block serial number, and are output. Because it is faster to search the cache directory than searching the hard disk directory, the read speed may be increased.

Therefore, the cache directory may improve the overall efficiency of writing/reading blocks of blockchain for data storage and read as a whole.

In an embodiment of the present disclosure, the blockchain data storage and read speed may also be increased through a CAM directory. A specific implementation process includes: read a directory in the directory region, and copy the directory to a CAM to obtain the CAM directory. Accordingly, recording, in the directory region, the target mapping relationship between the target block serial number and the target cluster address includes: record, in the CAM directory, the target mapping relationship. Accordingly, the data read process includes:

Step 1: Receive a read request to read the target block.

Step 2: Search the CAM directory for the target cluster address corresponding to the target block serial number.

Step 3: Read the target block contents from the data region according to the target cluster address.

Step 4: Output the target block contents.

For ease of description, data storage and data read based on the CAM directory are described below in combination.

Figure 6:
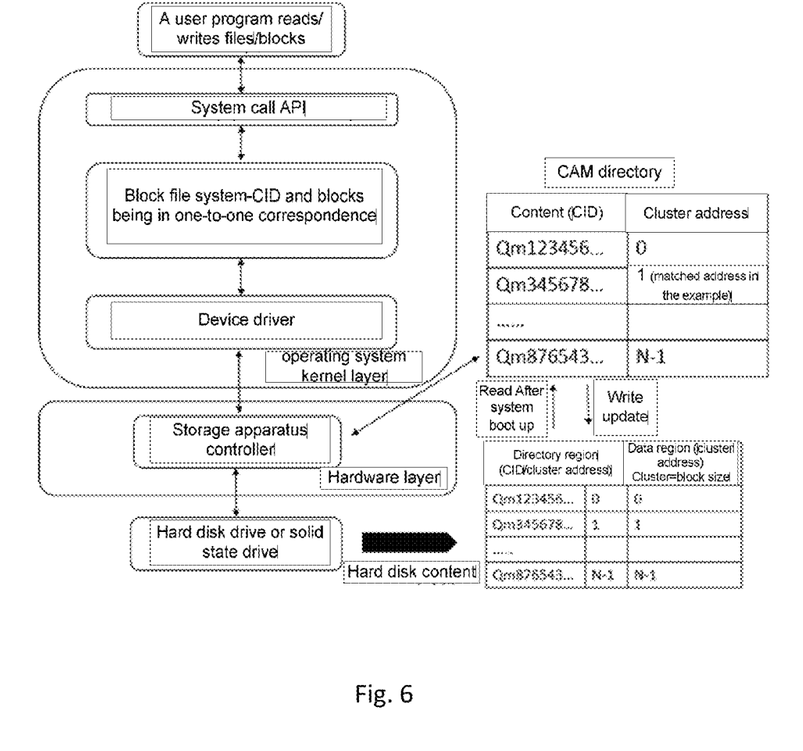
FIG. 6 is a schematic diagram of a data access based on a CAM directory according to an embodiment of the present disclosure.

FIG. 6 shows a schematic diagram of a data access based on the CAM directory according to an embodiment of the present disclosure.

The CAM, based on the structure and characteristics of fast content addressing, may be used with a block file directory for fast addressing, i.e., a cluster address, in the CAM directory with CID as a content.

Figure 7:
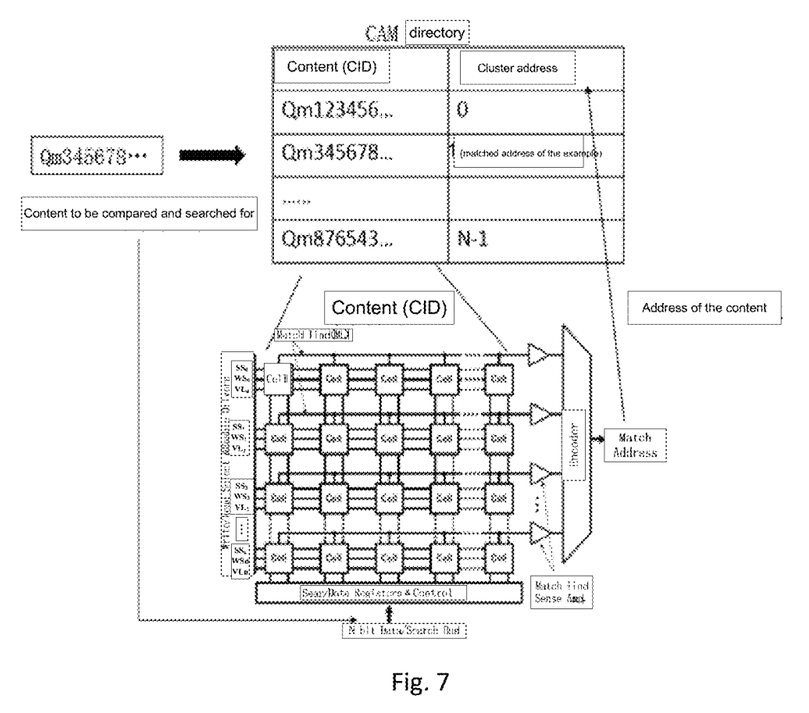
FIG. 7 is a schematic diagram of a CAM directory according to an embodiment of the present disclosure.

Therein, the CAM directory may be specifically referred to FIG. 7, which is a schematic diagram of a CAM directory according to an embodiment of the present disclosure. Therein, the upper part in FIG. 7 is a block diagram of the CAM directory herein, and the lower part is a schematic diagram of CAM generic design in a semiconductor integrated circuit. As shown in FIG. 7, the CAM includes a data comparator, cells, and an address encoder. FIG. 7 illustrates an example to search for an address of the content Qm345678 . . . .

Block read/write acceleration at a hardware layer may be achieved through a storage apparatus controller+the CAM directory. When the computer system is powered on and boosted up, the hard disk completely copies the directory list to the CAM directory of the storage apparatus controller.

Writing blocks of the blockchain: after receiving the target block serial number and the target block contents, a program first updates the CAM directory (using sequential write), and then sequentially writes the target block serial number and the target block contents to the directory region and the data region of the hard disk based on the free hard disk space. Since the storage apparatus controller and the CAM directory are highly integrated hardware circuits, the data read/write speed is higher, and updates of the CAM directory have less impact on the efficiency of writing the blocks of blockchain. Of course, in practice, instead of being updated synchronously every time the CAM directory is updated, the hard disk directory is updated only when, for example, the system is shut down, or when the system is about to lose power, or when the system is currently idle (for example, when there are no requests to write/read a block in blockchain).

It is to be noted that regardless of how the directories are updated, data synchronization between the CAM directory and the directory region of the hard disk needs to be ensured.

Reading blocks of the blockchain: After the target block serial number to be read is determined, the target block contents may be obtained from the hard disk by searching the CAM directory for the target cluster address corresponding to the target block serial number, and are replied. Because it is faster to search the CAM directory than searching both the hard disk directory and the cache directory, the read speed may be increased to the greatest extent.

According to this embodiment, the CAM may be used, or a dynamic random access memory (DRAM) or a static random access memory (SRAM) may be used.

Figure 8:
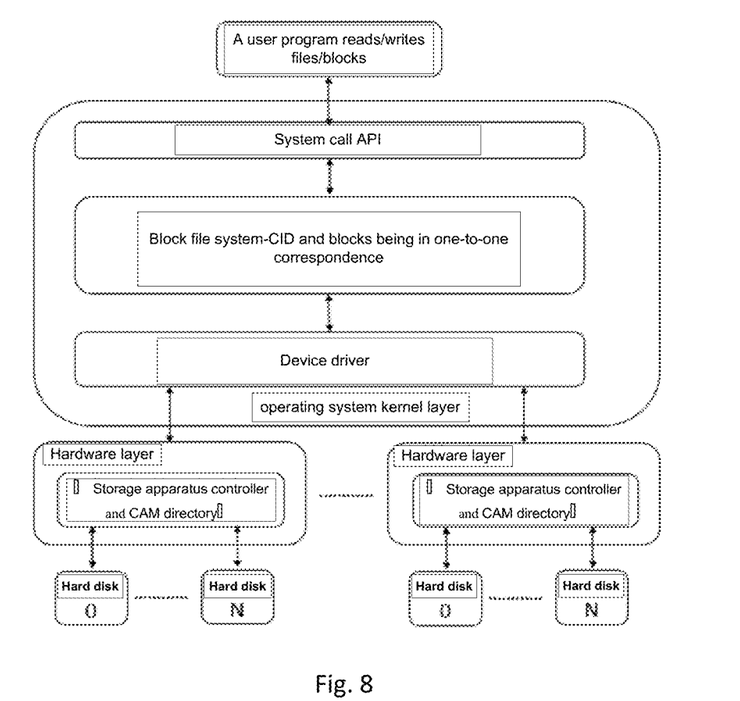
FIG. 8 is a schematic diagram of another data access based on a CAM directory according to an embodiment of the present disclosure.

Further, referring to FIG. 8, according to a system according to an embodiment of the present disclosure, a software kernel layer is matched with a block file system, and storage apparatus controllers, added with CAM directories, may be designed and produced with current semiconductor integrated circuit technology. Matched with corresponding software, the CAM directories are added to a device driver and the storage apparatus controllers, and each storage apparatus controller is added with one CAM directory, so as to access a plurality of hard disk system levels.

Corresponding to the above-mentioned method embodiment, an embodiment of the present disclosure further provides a block file system, and the block file system described below and the blockchain data storage method described above may be cross-referenced.

Figure 9:
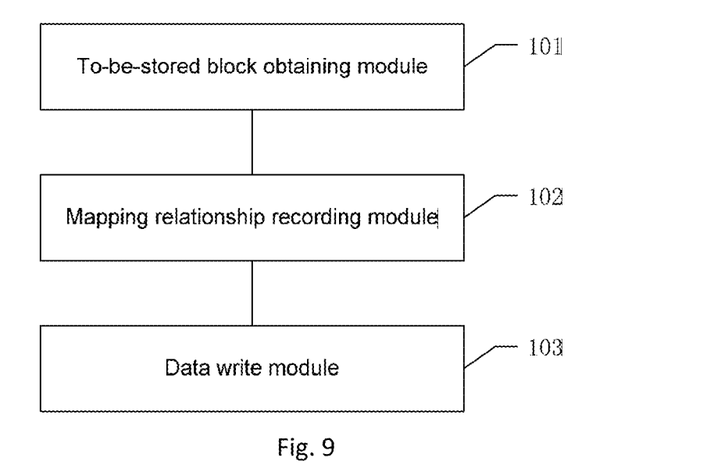
FIG. 9 is a schematic structural diagram of a block file system according to an embodiment of the present disclosure.

Referring to FIG. 9, the system includes the following modules:

a to-be-stored block obtaining module 101, configured to obtain a target block serial number and target block contents of a target block, the block file system including a directory region and a data region, a size of each cluster in the data region being the same as a block size of blockchain, the directory region storing mapping relationships between block serial numbers and cluster addresses;

a mapping relationship recording module 102, configured to sequentially allocate a target cluster address to the target block, and record, in the directory region, a target mapping relationship between the target block serial number and the target cluster address; and a data write module 103, configured to sequentially write the target block contents into the data region according to the target cluster address.

With the implementation of the system provided by the embodiment of the present disclosure, the block file system obtains the target block serial number and the target block contents of the target block, the block file system including the directory region and the data region, the size of each cluster in the data region being the same as the block size of blockchain, the directory region storing the mapping relationships between the block serial numbers and the cluster addresses; the target cluster address is sequentially allocated to the target block, and the target mapping relationship between the target block serial number and the target cluster address is recorded in the directory region; and the target block contents area written into the data region according to the target cluster address.

In this system, the block file system sets the size of each cluster in the data region as the block size based on the unique serial number, i.e., the block serial number, of each block of blockchain as well as the fixed size of the blocks, such that mapping relationships recorded in the directory region are correspondingly the mapping relationships between the block serial numbers and the cluster addresses. In other words, the blocks correspond to the clusters, and the directory region directly uses the block serial numbers as cluster indexes. The mapping relationship between the blockchain directory structure and the data region is simple and clear, and each block corresponds to one cluster. In this system, during block storage, the target block contents may be directly sequentially written into the data region after the target cluster address is determined. Since the directory is simple, data write may adopt sequential write, which may greatly save search time and data write time and may increase the data write speed in blockchain.

In an embodiment of the present disclosure, the system further includes: a data read module, configured to receive a read request to read the target block; search the directory region for the target cluster address corresponding to the target block serial number; read the target block contents from the data region according to the target cluster address; and output the target block contents.

In an embodiment of the present disclosure, the system further includes:
a cache acceleration module, configured to read a directory in the directory region, and write the directory into a cache to obtain a cache directory; and
a corresponding mapping relationship recording module 102, specifically configured to record, in the cache directory, the target mapping relationship.

In an embodiment of the present disclosure, the system further includes: a data read module, configured to receive a read request to read the target block; search the cache directory for the target cluster address corresponding to the target block serial number; read the target block contents from the data region according to the target cluster address; and output the target block contents.

In an embodiment of the present disclosure, the system further includes: a CAM acceleration module, configured to read a directory in the directory region, and copy the directory into a CAM to obtain a CAM directory; and
a corresponding mapping relationship recording module 102, specifically configured to record, in the CAM directory, the target mapping relationship.

In an embodiment of the present disclosure, the system further includes: a data read module, configured to receive a read request to read the target block; search the CAM directory for the target cluster address corresponding to the target block serial number; read the target block contents from the data region according to the target cluster address; and output the target block contents.

In an embodiment of the present disclosure, the data write module 103 is specifically configured to write the target block contents into contiguous sectors of a hard disk corresponding to the data region.

In order to facilitate a better understanding of the technical effects of the blockchain data storage method and the block file system according to the embodiments of the present disclosure by a person skilled in the art, the block file system according to the embodiment of the present disclosure is described in detail below in conjunction with related technology.

Efficiency comparison results between the block file system according to the embodiment of the present disclosure and a hard-disk-drive based file system are shown in Table 1.

TABLE 1

| Item-Hard disk drive | FAT-4 KB | FAT-64 KB | Block file + Hardware layer storage apparatus + CAM |
|---|---|---|---|
| Directory search time/times | 5.5 ms/1 | 5.5 ms/1 | 0.00015 ms (150 ns)/1 |
| FAT1 linked list search time/times | 82.5 ms/15 | 16.5 ms/3 | 0 |
| Search time/times of each cluster in the data region | Min: 5.5 ms/1 (contiguous clusters-contiguous sectors) Max: 82.5 ms/15 (discontiguous clusters) Average: 44 ms | Min: 5.5 ms/1 (contiguous clusters-contiguous sectors) Max: 16.5 ms/3 (discontiguous clusters) Average: 11 ms | 5.5 ms/1 (contiguous sectors in a cluster) |
| Transfer time of each cluster in the data region | Min: 2.08 ms (120 MB/s, contiguous cluster sectors) Max: 20.8 ms (12 MB/s, discontiguous sectors in each cluster) Average: 44 ms | Min: 2.08 ms (120 MB/s, contiguous cluster sectors) Max: 20.8 ms (12 MB/s, discontiguous sectors in each cluster) Average: 44 ms | 2.08 ms (120 MB/s, contiguous cluster sectors) |

TABLE 1-continued

| Item-Hard disk drive | FAT-4 KB | FAT-64 KB | Block file + Hardware layer storage apparatus + CAM |
|---|---|---|---|
| Total average time to read/write 256 KB | 174 ms | 77 ms | 7.5805 ms |
| Ratio of total time to read/write 256 KB | 22.95 | 10.16 | 1 |

Therein, only the time related to the file system and the hard disk is listed in the comparison conditions.

The FAT directory and the FAT1/2 linked lists need to be read from the hard disk.

The block size of a block of blockchain to be read/written is 256 KB.

The size of each sector of the hard disk drive=4 KB.

The size of each cluster of the FAT is 4 KB (corresponding to the size of 1 sector) and 64 KB (corresponding to the size of 16 sectors).

The size of each cluster of the block file system=256 KB (corresponding to 64 sectors).

Serial attached SCSI (SAS), i.e. an SAS hard disk that uses small computer system interface (SCSI) technology, is 15000 rpm, that is, the average access time of the hard disk=rotational hysteresis time+head seek time=approximately 2+3.5=5.5 ms.

The SAS is 15000 rpm, i.e. the 4 KB/64 KB random access hypothesis of the hard disk is up to 12 MB/S, and the 256 KB+ access or sequential access hypothesis may be up to 120 MB/S.

In the block file system, except for the special case of sector corruption, the sequential write feature thereof allows the hard disk sectors to be contiguous, as opposed to the FAT file system, which cannot guarantee that sectors are necessarily contiguous, reducing the 4 KB/64 KB random access efficiency.

Efficiency comparison results between the block file system according to the embodiment of the present disclosure and a solid-state-drive based file system are shown in Table 2 and Table 3.

TABLE 2

| Item-Solid state drive-Read | FAT-4 KB | FAT-64 KB | The present disclosure Block file + Hardware layer storage apparatus + CAM |
|---|---|---|---|
| Directory search time/times | 100 us/1 | 100 us/1 | 0.15 us (150 ns)/1 |
| FAT1 linked list search time/times | 1500 us/15 | 300 us/3 | 0 |
| Search time/times of each cluster in the data region | Min: 100 us/1 (contiguous clusters-contiguous sectors) Max: 1500 us/15 (discontiguous clusters) Average: 800 us | Min: 100 us/1 (contiguous clusters-contiguous sectors) Max: 300 us/3 (discontiguous clusters) Average: 200 us | 100 us/1 (contiguous sectors in a cluster) |
| Read transfer time of each cluster in the data region | Min: 53.53 us (3000 MB/s, contiguous cluster sectors) Max: 5000 us (50 MB/s, discontiguous sectors in each cluster) Average: 2541.665 us | Min: 83.33 us (3000 MB/s, contiguous cluster sectors) Max: 1000 us (250 MB/s, discontiguous sectors in each cluster) Average: 541.6 us | 83.33 us (3000 MB/s, contiguous cluster sectors) |
| Total average time to read 256 KB | 4941.665 us | 1141.6 us | 183.48 us |
| Ratio of total time to read 256 KB | 26.93 | 6.22 | 1 |

TABLE 3

| Item-Solid state drive-Write | FAT-4 KB | FAT-64 KB | The present disclosure Block file + Hardware layer storage apparatus + CAM |
|---|---|---|---|
| Directory search time/times | 100 us/1 | 100 us/1 | 0.15 us (150 ns)/1 |
| FAT1 linked list search time/times | 1500 us/15 | 300 us/3 | 0 |

TABLE 3-continued

| Item-Solid state drive-Write | FAT-4 KB | FAT-64 KB | The present disclosure Block file + Hardware layer storage apparatus + CAM |
|---|---|---|---|
| Search time/times of each cluster in the data region | Min: 100 us/1 (contiguous clusters-contiguous sectors) Max: 1500 us/15 (discontiguous clusters) Average: 800 us | Min: 100 us/1 (contiguous clusters-contiguous sectors) Max: 300 us/3 (discontiguous clusters) Average: 200 us | 100 us/1 (contiguous sectors in a cluster) |
| Write transfer time of each cluster in the data region | Min: 83.33 us (3000 MB/s, contiguous cluster sectors) Max: 1666.6 us (150 MB/s, discontiguous sectors in each cluster) Average: 874.95 us | Min: 83.33 us (3000 MB/s, contiguous cluster sectors) Max: 500 us (500 MB/s, discontiguous sectors in each cluster) Average: 291.665 us | 83.33 us (3000 MB/s, contiguous cluster sectors) |
| Total average time to write 256 KB | 3274.95 us | 891.665 us | 183.48 us |
| Ratio of total time to write 256 KB | 17.85 | 4.86 | 1 |

Only the time related to the file system and the hard disk is listed in the comparison conditions.

The FAT directory and the FAT1/2 linked lists need to be read from the hard disk.

The block size of a block of blockchain to be read/written is 256 KB.

The size of each sector of the hard disk=4 KB.

The size of each cluster of the FAT is 4 KB and 64 KB.

The size of each cluster of the block file system=256 KB.

The average access time (i.e. seek time) of the solid state drive is approximately 100 us.

M.2 PCIe solid state drive: 256K+ access or sequential access hypothesis may be 3000 MB/S or more; 4 KB random read; write hypotheses are approximately: 50 MB/S and 150 MB/S, respectively;

64 KB random read; write hypotheses are approximately: 250 MB/S and 500 MB/S, respectively.

In the block file system, except for the special case of sector corruption, the sequential write feature thereof allows the hard disk sectors to be contiguous, as opposed to the FAT file system, which may not guarantee that sectors are necessarily contiguous.

To sum up, the efficiency improvement of the block file system according to the embodiment of the present disclosure relative to the file systems is as follows: compared with the hard-disk-drive based file system, the read/write efficiency of the block file system is 10.1 to 22.95 times higher; and compared with the solid-state-drive based file system, the read efficiency of the block file system is 6.22 to 26.93 times higher, and the write efficiency of the block file system is 4.86 to 17.85 times higher.

The above efficiency comparison is based on a 256 KB blockchain block stored on the hard disk drive and the solid state drive to obtain quantitative analysis and comparison data. In practice, the total time saved by acceleration during storage and search for thousands of blocks may also be quantified in this way.

Corresponding to the above-mentioned method embodiment, an embodiment of the present disclosure further provides an electronic device, and the electronic device described below and the blockchain data storage method described above may be cross-referenced.

Figure 10:
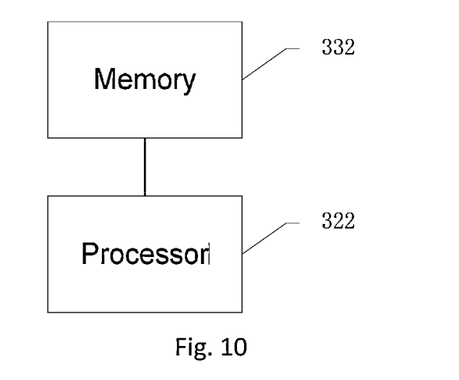
FIG. 10 is a schematic structural diagram of an electronic device according to an embodiment of the present disclosure.

Referring to FIG. 10, the electronic device includes: a memory 332, configured to store a computer program; and a processor 322, configured to implement, when executing the computer program, the steps of the blockchain data storage method according to the above-mentioned method embodiment.

Figure 11:
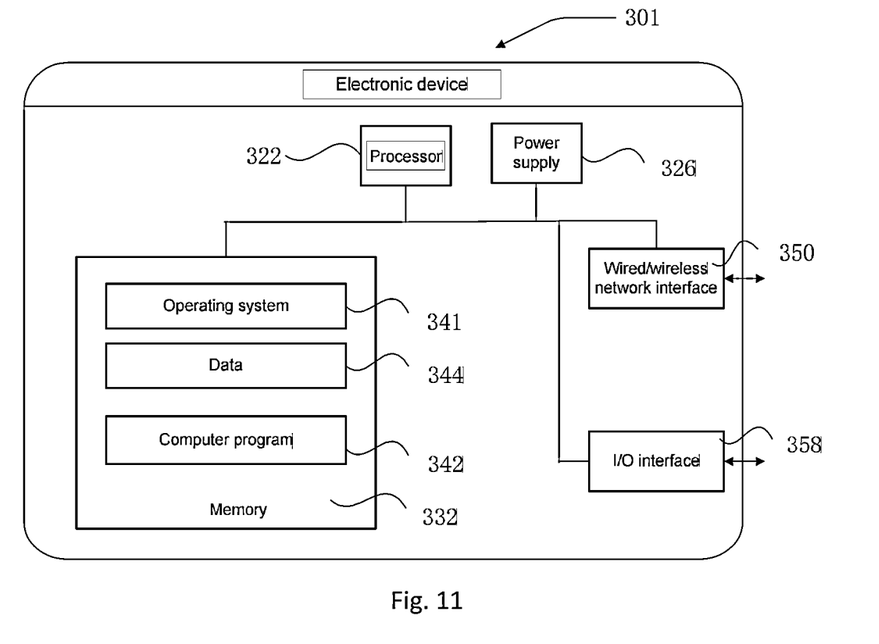
FIG. 11 is a specific structural diagram of an electronic device according to an embodiment of the present disclosure.

Specifically, please refer to FIG. 11, which is a specific structural diagram of the electronic device according to this embodiment. The electronic device may vary greatly depending on configuration or performance and may include one or more central processing units (CPUs) 322 (e.g., one or more processors) and the memory 332. The memory 332 stores one or more computer applications 342 or data 344. Therein, the memory 332 may be ephemeral storage or persistent storage. The program stored in the memory 332 may include one or more modules (not shown), each of which may include a series of instructional operations on a data processing device. Furthermore, the central processing unit 322 may be set to communicate with the memory 332, so as to execute the series of instructional operations in the memory 332 on the electronic device 301.

The electronic device 301 may further include one or more power supplies 326, one or more wired or wireless network interfaces 350, one or more input/output interfaces 358, and/or, one or more operating systems 341.

The steps in the blockchain data storage method described above may be implemented by the structure of the electronic device.

Corresponding to the above-mentioned method embodiment, an embodiment of the present disclosure further provides a readable storage medium, and the readable storage medium described below and the blockchain data storage method described above may be cross-referenced.

The readable storage medium has a computer program stored thereon, and the computer program implements, when executed by a processor, the steps of the blockchain data storage method according to the above-mentioned method embodiment.

The readable storage medium may specifically be a USB flash drive, a removable hard disk, a read-only memory (ROM), a random access memory (RAM), a diskette, or a compact disk, and various other readable storage media that may store program codes.

A person skilled in the art will further realize that the elements and algorithm steps described in connection with the embodiments disclosed herein may be implemented as electronic hardware, computer software, or combinations of both, and that the elements and steps of the examples have been described above generally in terms of their functionality in order to clearly illustrate this interchangeability of hardware and software. Whether to implement such functionality as hardware or software depends upon the particular application and design constraints imposed on the implementation. Those skilled in the art may implement the described functionality in varying ways for each particular application, but such implementations should not be interpreted as causing a departure from the scope of the present disclosure.

What is claimed is:

1. A blockchain data storage method, comprising:
   obtaining, by a block file system, a target block serial number and target block contents of a target block, the block file system comprising a directory region and a data region, a size of each cluster in the data region being a same as a block size of blockchain, the directory region storing mapping relationships between block serial numbers and cluster addresses;
   sequentially allocating a target cluster address to the target block, and recording, in the directory region, a target mapping relationship between the target block serial number and the target cluster address; and
   sequentially writing the target block contents into the data region according to the target cluster address.

2. The blockchain data storage method according to claim 1, further comprising:
   receiving a read request for reading the target block;
   searching the directory region for the target cluster address corresponding to the target block serial number;
   reading the target block contents from the data region according to the target cluster address; and
   outputting the target block contents.

3. The blockchain data storage method according to claim 1, further comprising:
   reading a directory in the directory region, and writing the directory into a cache to obtain a cache directory, wherein
   recording, in the directory region, the target mapping relationship between the target block serial number and the target cluster address comprises:
   recording, in the cache directory, the target mapping relationship.

4. The blockchain data storage method according to claim 3, further comprising:
   receiving a read request for reading the target block;
   searching the cache directory for the target cluster address corresponding to the target block serial number;
   reading the target block contents from the data region according to the target cluster address; and
   outputting the target block contents.

5. The blockchain data storage method according to claim 1, further comprising:
   reading a directory in the directory region, and copying the directory into a Content Address able Memory (CAM) to obtain a CAM directory, wherein
   recording, in the directory region, the target mapping relationship between the target block serial number and the target cluster address comprises:
   recording, in the CAM directory, the target mapping relationship.

6. The blockchain data storage method according to claim 5, further comprising:
   receiving a read request for reading the target block;
   searching the CAM directory for the target cluster address corresponding to the target block serial number;
   reading the target block contents from the data region according to the target cluster address; and
   outputting the target block contents.

7. The blockchain data storage method according to claim 1, sequentially writing the target block contents into the data region comprises:
   writing the target block contents into contiguous sectors of a hard disk corresponding to the data region.

8. An electronic device, comprising:
   a memory, configured to store a computer program; and
   a processor, configured to execute the computer program, and upon execution of the computer program, the processor is configured to:
   obtain, through a block file system, a target block serial number and target block contents of a target block, the block file system comprising a directory region and a data region, a size of each cluster in the data region being a same as a block size of blockchain, the directory region storing mapping relationships between block serial numbers and cluster addresses;
   sequentially allocate a target cluster address to the target block, and record, in the directory region, a target mapping relationship between the target block serial number and the target cluster address; and
   sequentially write the target block contents into the data region according to the target cluster address.

9. A non-transitory computer-readable storage medium, storing a computer program that, when executed by a processor, cause the processor to:
   obtain, through a block file system, a target block serial number and target block contents of a target block, the block file system comprising a directory region and a data region, a size of each cluster in the data region being a same as a block size of blockchain, the directory region storing mapping relationships between block serial numbers and cluster addresses;
   sequentially allocate a target cluster address to the target block, and record, in the directory region, a target mapping relationship between the target block serial number and the target cluster address; and
   sequentially write the target block contents into the data region according to the target cluster address.

10. The electronic device according to claim 8, the processor is further configured to:
    receive a read request for reading the target block;
    search the directory region for the target cluster address corresponding to the target block serial number;
    read the target block contents from the data region according to the target cluster address; and
    output the target block contents.

11. The electronic device according to claim 8, the processor is further configured to:
    read a directory in the directory region, and writing the directory into a cache to obtain a cache directory, wherein
    record, in the directory region, the target mapping relationship between the target block serial number and the target cluster address comprises:
    record, in the cache directory, the target mapping relationship.

12. The electronic device according to claim 11, the processor is further configured to:

receive a read request for reading the target block;

search the cache directory for the target cluster address corresponding to the target block serial number;

read the target block contents from the data region according to the target cluster address; and output the target block contents.

13. The electronic device according to claim 8, the processor is further configured to:

read a directory in the directory region, and copying the directory into a Content Address able Memory (CAM) to obtain a CAM directory, wherein record, in the directory region, the target mapping relationship between the target block serial number and the target cluster address comprises:

record, in the CAM directory, the target mapping relationship.

14. The electronic device according to claim 13, the processor is further configured to:

receive a read request for reading the target block;

search the CAM directory for the target cluster address corresponding to the target block serial number;

read the target block contents from the data region according to the target cluster address; and output the target block contents.

15. The electronic device according to claim 8, the processor is further configured to:

write the target block contents into contiguous sectors of a hard disk corresponding to the data region.

16. The non-transitory computer-readable storage medium according to claim 9, wherein the computer program further cause the processor to:

receive a read request for reading the target block;

search the directory region for the target cluster address corresponding to the target block serial number;

read the target block contents from the data region according to the target cluster address; and output the target block contents.

17. The blockchain data storage method according to claim 1, wherein the target block being any one of to-be-stored blocks.

18. The blockchain data storage method according to claim 1, wherein each target block has a unique target block serial number.

19. The blockchain data storage method according to claim 18, in the directory region the target block serial number is record as the target cluster index.

20. The blockchain data storage method according to claim 3, wherein the cache comprises one of: a Content Address able Memory (CAM), a dynamic random access memory (DRAM), a static random access memory (SRAM).

* * * * *